United States Patent
Perry et al.

(10) Patent No.: US 12,175,243 B2
(45) Date of Patent: Dec. 24, 2024

(54) HARDWARE MICRO-FUSED MEMORY OPERATIONS

(71) Applicant: Ampere Computing LLC, Santa Clara, CA (US)

(72) Inventors: Jonathan Christopher Perry, Santa Clara, CA (US); Jason Anthony Bessette, Santa Clara, CA (US); Sean Philip Mirkes, Santa Clara, CA (US); Jacob Daniel Morgan, Santa Clara, CA (US); John Saint Tran, Santa Clara, CA (US)

(73) Assignee: Ampere Computing LLC, Santa Clara, CA (US)

( * ) Notice: Subject to any disclaimer, the term of this patent is extended or adjusted under 35 U.S.C. 154(b) by 386 days.

(21) Appl. No.: 16/722,870

(22) Filed: Dec. 20, 2019

(65) Prior Publication Data
US 2021/0191721 A1 Jun. 24, 2021

(51) Int. Cl.
*G06F 9/30* (2018.01)
*G06F 9/38* (2018.01)

(52) U.S. Cl.
CPC .......... *G06F 9/30043* (2013.01); *G06F 9/384* (2013.01)

(58) Field of Classification Search
CPC .... G06F 9/30043; G06F 9/384; G06F 9/3016; G06F 9/30181; G06F 9/3836
USPC ........................................................ 711/154
See application file for complete search history.

(56) References Cited

U.S. PATENT DOCUMENTS

| | | |
|---|---|---|
| 8,458,444 B2 | 6/2013 | Chou et al. |
| 9,223,577 B2 | 12/2015 | Mylius et al. |
| 2011/0040955 A1* | 2/2011 | Hooker .................. G06F 9/384 |
| | | 712/225 |
| 2014/0181474 A1 | 6/2014 | Gewirtz et al. |
| 2018/0095761 A1* | 4/2018 | Winkel ............... G06F 9/30043 |
| 2018/0165199 A1* | 6/2018 | Brandt ............... G06F 9/30043 |
| 2019/0163475 A1* | 5/2019 | King ................... G06F 9/30181 |
| 2019/0171452 A1* | 6/2019 | King ..................... G06F 9/3834 |
| 2019/0179639 A1 | 6/2019 | Boersma et al. |

(Continued)

FOREIGN PATENT DOCUMENTS

| | | | | |
|---|---|---|---|---|
| CN | 108845830 A | * | 11/2018 | ......... G06F 9/30043 |
| WO | WO-2019051446 A1 | * | 3/2019 | ......... G06F 13/1684 |

OTHER PUBLICATIONS

International Search Report and Written Opinion for International Patent Application No. PCT/US2020/065725, mailed Apr. 14, 2021, 16 pages.

(Continued)

*Primary Examiner* — Gautam Sain
*Assistant Examiner* — Wei Ma
(74) *Attorney, Agent, or Firm* — Withrow & Terranova, PLLC (57) ABSTRACT

Aspects disclosed include hardware micro-fused memory (e.g., load and store) operations. In one aspect, a hardware micro-fused memory operation is a single atomic memory operation performed using a plurality of data register operands, for example a load pair or store pair operation. The load pair or store pair operation is treated as two separate operations for purposes of renaming, but is scheduled as a single micro-operation having two data register operands. The load or store pair operation is then performed atomically.

13 Claims, 5 Drawing Sheets

(56) References Cited

U.S. PATENT DOCUMENTS

2020/0042322 A1* 2/2020 Wang .................... G06F 9/3851

OTHER PUBLICATIONS

Intention to Grant for European Patent Application No. 20842451.5, mailed Mar. 27, 2024, 30 pages.
Examination Report for European Patent Application No. 20842451.5, mailed Jun. 12, 2023, 4 pages.

* cited by examiner

HARDWARE MICRO-FUSED MEMORY OPERATIONS

BACKGROUND

I. Field of the Disclosure

The technology of the disclosure relates generally to processor memory operations, and specifically to atomic load and store operations having multiple destinations.

II. Background

Memory operations (e.g., load and store operations) are operations which write data to or read data from a memory associated with a processor. Such memory operations are conventionally a significant portion of many processor workloads, and thus, the ability to perform memory operations quickly and efficiently can improve the overall performance of the processor. For workloads that have large data sets (e.g., many cloud-computing workloads), load and store operations can comprise the majority of all instructions associated with a particular workload.

In order to address this, some computer architectures have fused multiple individual memory instructions into a single larger memory operation, but this approach involves significant microarchitectural tracking overhead in order to ensure correct operation of the processor. Other processing architectures may provide enhanced memory operations such as paired load and store instructions (e.g., Arm's load pair and store pair instructions). Such operations may effectively perform two memory operations encapsulated within a single instruction on contiguous memory locations in order to save instruction bandwidth, while using the full data width of the existing hardware memory operation pipeline.

To increase the performance of a processor with respect to memory operations, one conventional approach is to increase the number of hardware memory operation pipelines in the processor. However, adding hardware memory operation pipelines to the processor is relatively costly in terms of silicon area and operational complexity, and may involve unacceptable trade-offs with other desired functionality. Another approach would be to reduce the number of clock cycles of latency associated with memory operations. However, this may lead to reduced overall clock frequency, and may degrade performance in non-memory operations. Therefore, it is desirable to identify other techniques that improve the ability of the processor to perform memory operations.

SUMMARY OF THE DISCLOSURE

Aspects disclosed in the detailed description include hardware micro-fused memory (e.g., load and store) operations. In one aspect, a hardware micro-fused memory operation is a single atomic memory operation performed using a plurality of data register operands, for example a load pair or store pair operation. The load pair or store pair operation is treated as two separate operations for purposes of renaming, but is scheduled as a single operation with a plurality of data register operands. The load or store pair operation is then performed atomically.

In this regard in one aspect, an apparatus comprises a rename block to receive a first memory operation that specifies a plurality of data register operands and perform renaming on the first memory operation. The apparatus further comprises a scheduling block to receive the renamed first memory operation, store the renamed first memory operation in at least one entry of a plurality of scheduling block entries, and schedule the first memory operation as a single operation with a plurality of data register operands. The apparatus further comprises a memory operation block to receive the scheduled first memory operation and atomically perform the first memory operation across the plurality of data register operands.

In another aspect, an apparatus comprises means for renaming to receive a first memory operation that specifies a plurality of data register operands and perform renaming on the first memory operation. The apparatus further comprises means for scheduling to receive the renamed first memory operation, store the renamed first memory operation in at least one entry of a plurality of scheduling block entries, and schedule the first memory operation as a single operation with a plurality of data register operands. The apparatus further comprises means for performing memory operations to receive the scheduled first memory operation and atomically perform the first memory operation across the plurality of data register operands.

In yet another aspect, a method comprises receiving a first memory operation that specifies a plurality of data register operands at a rename block, and performing renaming on the first memory operation by the rename block. The method further comprises providing the renamed first memory operation to a scheduling block, and scheduling the renamed first memory operation as a single operation with a plurality of data register operands. The method further comprises providing the scheduled first memory operation to a memory operation block to be performed atomically across the plurality of data register operands.

In yet another aspect, a non-transitory computer-readable medium stores computer executable instructions which, when executed by a processor, cause the processor to receive a first memory operation that specifies a plurality of data register operands at a rename block and perform renaming on the first memory operation by the rename block. The instructions further cause the processor to provide the renamed first memory operation to a scheduling block, and to schedule the renamed first memory operation as a single operation with a plurality of data register operands. The instructions further cause the processor to provide the scheduled first memory operation to a memory operation block, and to perform the scheduled first memory operation atomically by the memory block.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include hardware micro-fused memory (e.g., load and store) operations. In one aspect, a hardware micro-fused memory operation is a single atomic memory operation performed using a plurality of data register operands, for example a load pair or store pair operation. The load pair or store pair operation is treated as two separate operations for purposes of renaming, but is scheduled as a single operation having two data register operands. The load or store pair operation is then performed atomically.

Figure 1:
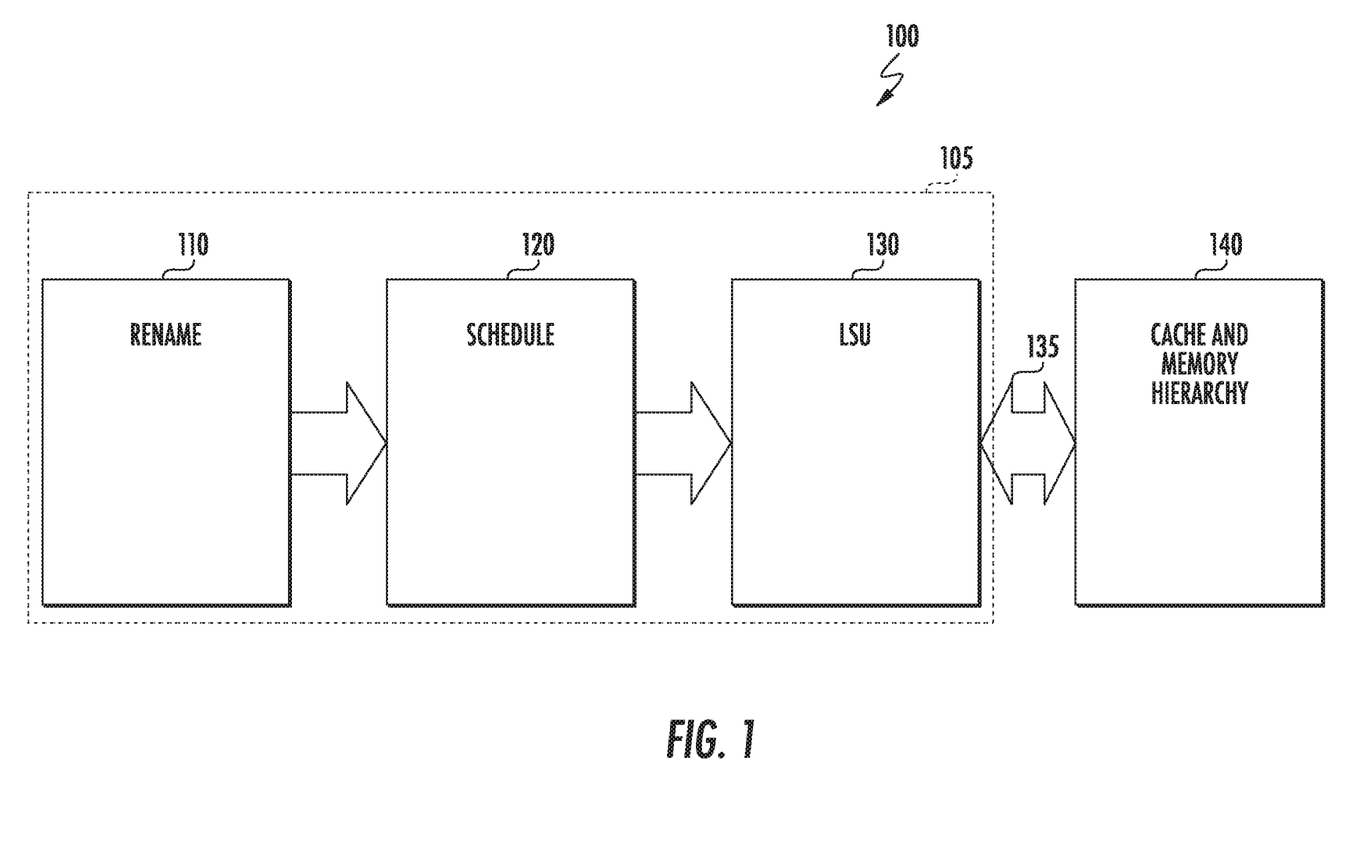
FIG. 1 is a block diagram of an exemplary processor supporting hardware micro-fused memory operations.

In this regard, FIG. 1 is a block diagram 100 of a portion of an exemplary processor 105 supporting hardware micro-fused memory operations. The processor 105 includes a rename block 110 coupled to a scheduling block 120, and may be configured to provide renamed hardware micro-fused memory operations to the scheduling block 120. The scheduling block 120 is coupled to a load/store unit 130, and may be configured to schedule hardware micro-fused memory operations on the load/store unit 130 for execution. The load/store unit 130 may be coupled to a cache and memory hierarchy 140, and may be configured to carry out hardware micro-fused memory operations atomically. The cache and memory hierarchy 140 may include one or more levels of cache (which may be private to the processor 105, or may be shared between the processor 105 and other non-illustrated processors), tightly coupled memory, main memory, or other types of memory known to those having skill in the art.

In operation, the rename block 110 receives a hardware micro-fused memory operation (e.g., a load pair or store pair operation), and performs renaming on the hardware micro-fused memory operation. In one aspect, the hardware micro-fused memory operation is treated as two individual memory operations (one operation for each data source register in the case of store pair or data destination register in the case of load pair), and thus the single hardware micro-fused memory operation effectively takes up two slots at rename. Using a separate slot in the rename block 110 for each data register operand of the hardware micro-fused memory operation mitigates an increase in size and complexity of the rename block 110 in order to support hardware micro-fused memory operations, at the cost of having more of the existing resources of the rename block 110 consumed when performing renaming on hardware micro-fused memory operations. In an alternative aspect, the size of the slots in the rename block may be increased in order to support hardware micro-fused memory operations. Whether stored as two individual memory operations or as a single memory operation in a larger rename slot, the rename block is configured to provide the hardware micro-fused memory operation to the scheduling block 120 as a single atomic memory operation having a plurality of data register operands.

The scheduling block 120 receives the hardware micro-fused memory operation (whether as two individual memory operations or as a single memory operation) from the rename block 110, and schedules the hardware micro-fused memory operation as a single memory operation having a plurality of data register operands (i.e., double the width of a single register in the case of load pair or store pair). In the case of a load pair operation, the scheduling block 120 stores the load pair operation as a single memory operation having two destination registers in a single entry of the scheduling block 120. The hardware micro-fused memory operation is then presented as an atomic operation to the load/store unit 130. In the case of a store pair operation, the scheduling block 120 stores the store pair operation across two scheduling block entries, which are later combined and performed as a single atomic operation comprising two independent micro-operations by the load/store unit 130.

The load/store unit 130 receives the hardware micro-fused memory operation from the scheduling block 120, and performs it as an atomic memory operation. In an aspect, the load/store unit 130 has a datapath 135 to the cache and memory hierarchy 140 that is wide enough to support the hardware micro-fused memory operation as a single transaction (i.e., the datapath 135 has a data width corresponding to the cumulative data width of the number of data register operands, so for a load pair or store pair operation, the datapath 135 would have a data width corresponding to double the size of a single register). In the case of a load pair operation, this may include loading a two-register-width value from a memory address and storing each half of the value in one of a pair of specified data destination registers. In the case of a store pair operation, this may include storing the contents of a pair of specified data source registers as a contiguous value starting at a specified memory address. In some aspects, the load/store unit 130 may further implement store-to-load forwarding between store pair and load pair operations.

Figure 2:
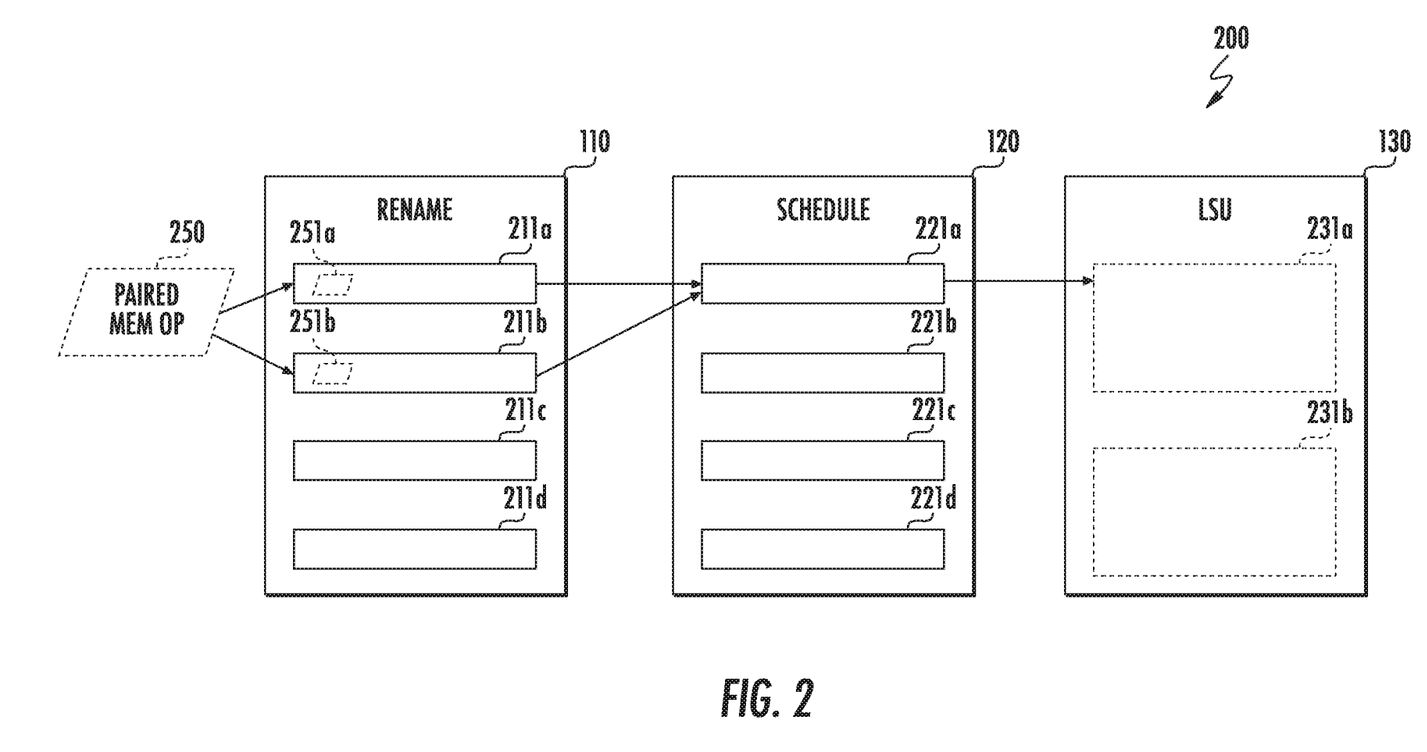
FIG. 2 is a detailed block diagram illustrating the flow of a hardware micro-fused memory operation through a portion of the exemplary processor of FIG. 1.

In this regard, FIG. 2 is a detailed block diagram 200 illustrating the flow of a hardware micro-fused memory operation 250 (which in some aspects may be a load pair or a store pair operation) through a portion of the exemplary processor of FIG. 1. The rename block 110, which includes four renaming slots 211a, 211b, 211c, and 211d, receives the hardware micro-fused memory operation 250 and processes it as two separate operations for purposes of renaming. For example, the rename block 110 may assign a first portion 251a of the hardware micro-fused memory operation 250 as a single operation representing a first data source/destination register to renaming slot 211a, and the rename block 110 may assign a second portion 251b of the hardware micro-fused memory operation 250 as another single operation representing a second data source/destination register to renaming slot 211b. Thus, for purposes of renaming, the renaming block 110 treats the hardware micro-fused memory operation 250 as two separate memory operations. As discussed above with reference to FIG. 1, this mitigates increasing the size and complexity of the rename block 110 in order to perform hardware micro-fused memory operations. The rename block 110 then performs renaming on the first portion 251a of the hardware micro-fused memory operation 250 in slot 211a and on the second portion 251b of the hardware micro-fused memory operation 250 in slot 211b, and provides both portions of the first hardware micro-fused memory operation 250 to the scheduling block 120.

The scheduling block 120 receives both the first portion 251a and the second portion 251b of the hardware micro-fused memory operation 250 from the rename block 110, and in the case of a load pair operation, stores both portions of the hardware micro-fused memory operation 250 in a single entry of the scheduling block 120 (in the case of a store pair operation, the hardware micro-fused memory operation 250 may be stored across two entries of the scheduling block 120, which may be provided to the load store unit 130 as a single atomic operation). The scheduling block 120 includes four scheduling slots 221a, 221b, 221c, and 221d, and in the case of a load pair operation, the hardware micro-fused memory operation 250 may be assigned to slot 221a in one aspect. Each of the scheduling slots 221a-d may include multiple destination fields in order to perform hardware micro-fused memory operations as will be discussed further with respect to FIG. 3. Once the hardware micro-fused memory operation 250 has been assigned to slot 221a in the scheduling block 120, the scheduling block may schedule the hardware micro-fused memory operation 250 for execution in the load/store unit 130, and may provide the hardware micro-fused memory operation 250 to the load/store unit 130 for execution as an atomic operation.

The load/store unit 130 includes a first load/store pipeline 231a and a second load/store pipeline 231b. The hardware micro-fused memory operation 250 is received from the scheduling block 120 and routed for execution to either the first load/store pipeline 231a or the second load/store pipeline 231b (in the illustrated aspect, the memory operation is routed to the first load/store pipeline 231a, but this is merely for illustrative purposes). In one aspect, both the first load/store pipeline 231a and the second load/store pipeline 231b support the full data width of the hardware micro-fused memory operation 250, and thus can perform the hardware micro-fused memory operation 250 as a single operation (i.e., in the case of a load pair operation, both the first load/store pipeline 231a and the second load/store pipeline 231b support a data width corresponding to double the size of a single register). The first load/store pipeline 231a then performs the hardware micro-fused memory operation 250 in conjunction with the cache and memory hierarchy 140 via the datapath 135 as described above with respect to FIG. 1. In one aspect, the load/store unit 130 may track the multiple destinations of the hardware micro-fused memory operation 250 independently. Further, in another aspect, where the hardware micro-fused memory operation 250 is a store pair operation, the load/store unit 130 may receive the hardware micro-fused memory operation 250 from two entries from the scheduling block 120 (as discussed above with reference to FIG. 1), and may perform the hardware micro-fused memory operation 250 as two independent micro-operations which are treated as a single atomic operation. The two independent micro-operations may point to a single entry in an associated store buffer. In an exemplary aspect, this may include a first micro-operation to perform address calculations and storage of a first data element, and a second micro-operation to perform storage of a second data element.

Figure 3:
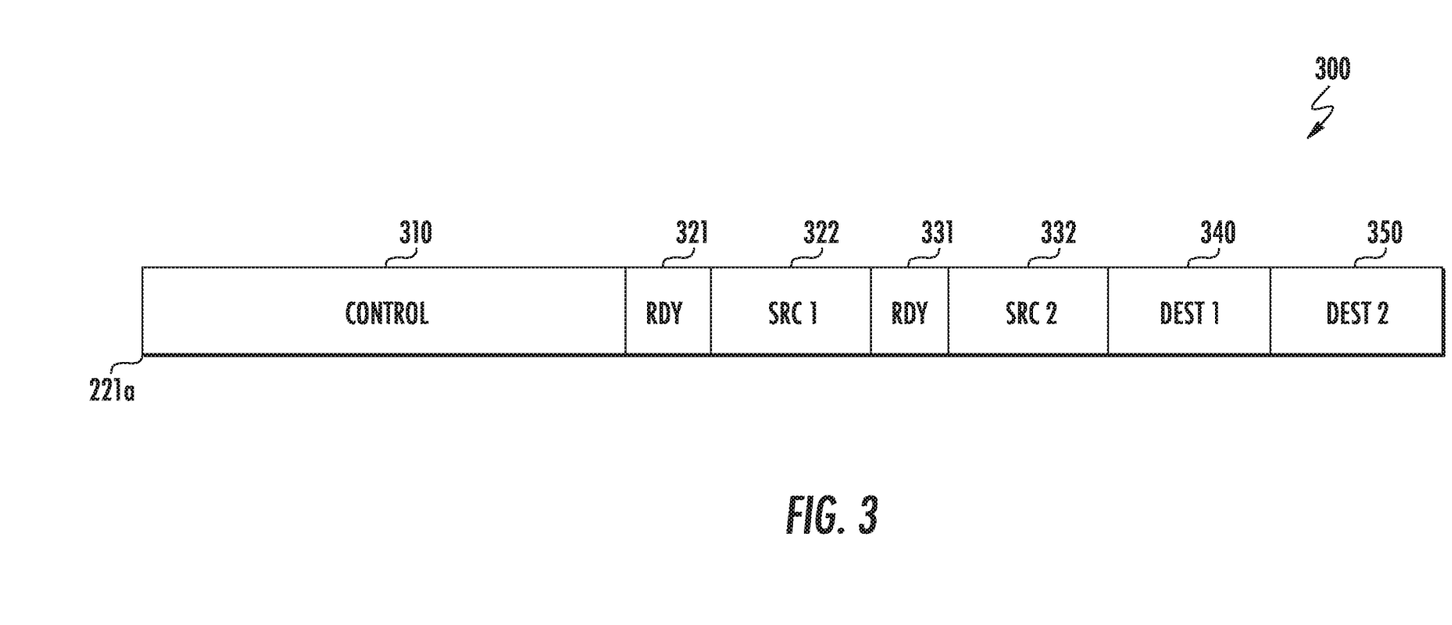
FIG. 3 is detailed diagram of an entry of the scheduling block of the exemplary processor of FIG. 1.

With respect to FIG. 3, a detailed diagram of an entry 300 of the scheduler of the exemplary processor of FIG. 1 (such as the scheduling block 120) is provided. For example, the entry 300 may correspond to any of entries 221a-d of the scheduling block 120. In one aspect, the entry 300 illustrated entry 221a into which hardware micro-fused memory operation 250 is stored by the scheduling block 120.

The entry 300 includes a control field 310, a first source ready field 321, a first source field 322, a second source ready field 331, a second source field 332, a first destination field 340, and a second destination field 350. The control field 310 contains general pipeline control information related to an operation such as the hardware micro-fused memory operation 250. The first source ready field 321 contains an indicator that indicates whether or not the first source indicated by the first source field 322 is ready for use. Similarly, the second source ready field 331 contains an indicator that indicates whether or not the second source indicated by the second source field 332 is ready for use. The first destination field 340 contains an indication of a first destination for an operation such as hardware micro-fused memory operation 250. The second destination field 350 contains an indication of a second destination for an operation such as hardware micro-fused memory operation 250.

By providing two source fields (first source field 321 and second source field 331) and two destination fields (first destination field 340 and second destination field 35) in each entry 300, the scheduling block 120 may store and schedule a single atomic memory operation performed using a plurality of data register operands (e.g., a plurality of sources, or a plurality of destinations) as described with respect to FIGS. 1 and 2.

Figure 4:
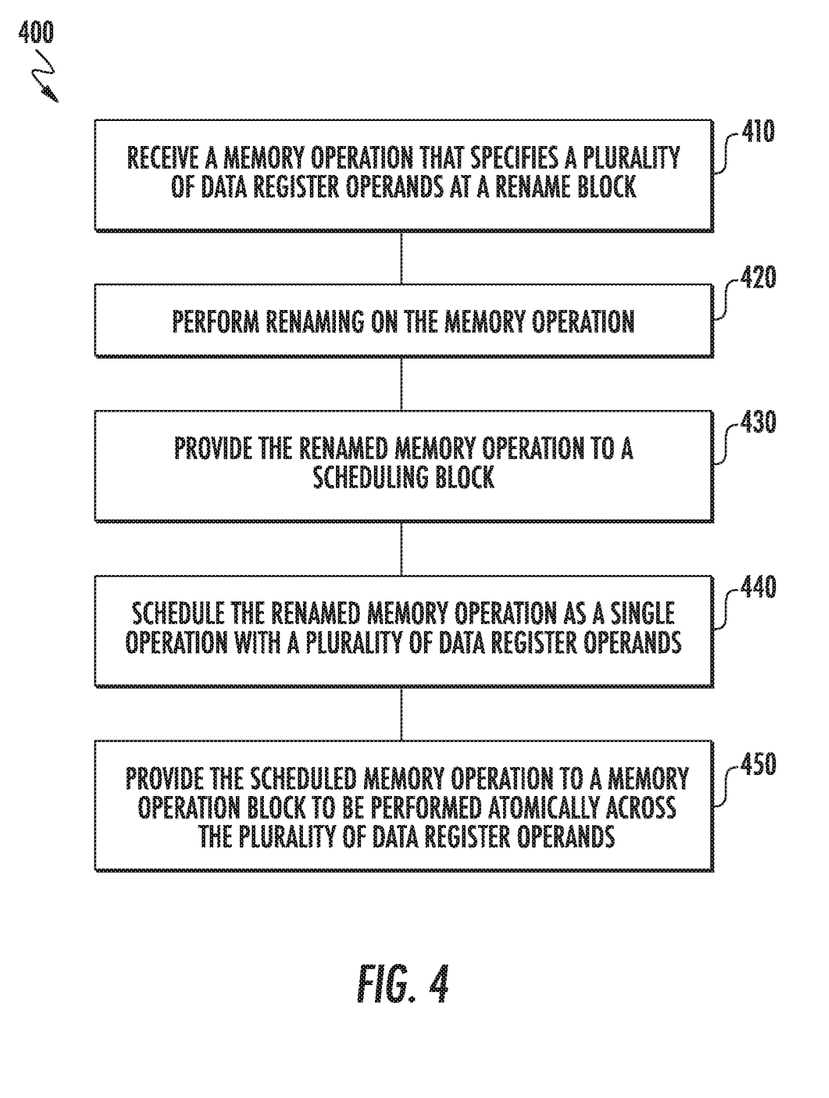
FIG. 4 is a flowchart illustrating a method of performing a hardware micro-fused memory operation.

In this regard, FIG. 4 is a flowchart illustrating a method 400 of performing a hardware micro-fused memory operation. The method begins in block 410, when a memory operation that specifies a plurality of data register operands is received at a rename block. For example, the hardware micro-fused memory operation 250 is received by the rename block 110.

The method 400 continues in block 420, where renaming is performed in the memory operation. For example, the rename block 110 stores the hardware micro-fused memory operation 250 as a first portion 251a in renaming slot 211a and a second portion 251b in renaming slot 211b, and performs renaming in slot 211a and slot 211b independently. The method then continues to block 430, where the renamed memory operation is provided to a scheduling block. For example, after performing renaming on the memory operation 250 by performing renaming on slot 211a and slot 211b independently, the rename block 110 provides the renamed memory operation 250 to the scheduling block 120.

The method 400 continues in block 440, where the scheduling block schedules the renamed memory operation as a single operation with a plurality of data register operands. For example, the scheduling block 120 stores the hardware micro-fused memory operation 250 in scheduling slot 221a, with the plurality of data register operands being stored in either first source field 322 and second source field 332, or first destination field 340 and second destination field 350.

The method continues in block 450, where the scheduler provides the scheduled memory operation to a memory operation block to be performed atomically across the plurality of data register operands. For example, the scheduling block 120 provides the hardware micro-fused memory operation as stored in scheduling slot 221a to the first load/store pipeline 231a, which performs the hardware micro-fused memory operation 250 atomically in conjunction with the cache and memory hierarchy 140 via the datapath 135.

Those having skill in the art will recognize that although certain exemplary aspects have been discussed above, the teachings of the present disclosure apply to other aspects. For example, although the above aspects have discussed paired operations, the teachings of the present disclosure would apply to larger numbers of grouped operations as well. Additionally, specific functions have been discussed in the context of specific hardware blocks, but the assignment of those functions to those blocks is merely exemplary, and the functions discussed may be incorporated into other hardware blocks without departing from the teachings of the present disclosure.

The portion of an exemplary processor supporting hardware micro-fused memory operations according to aspects disclosed herein may be provided in or integrated into any processor-based device. Examples, without limitation, include a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 5:
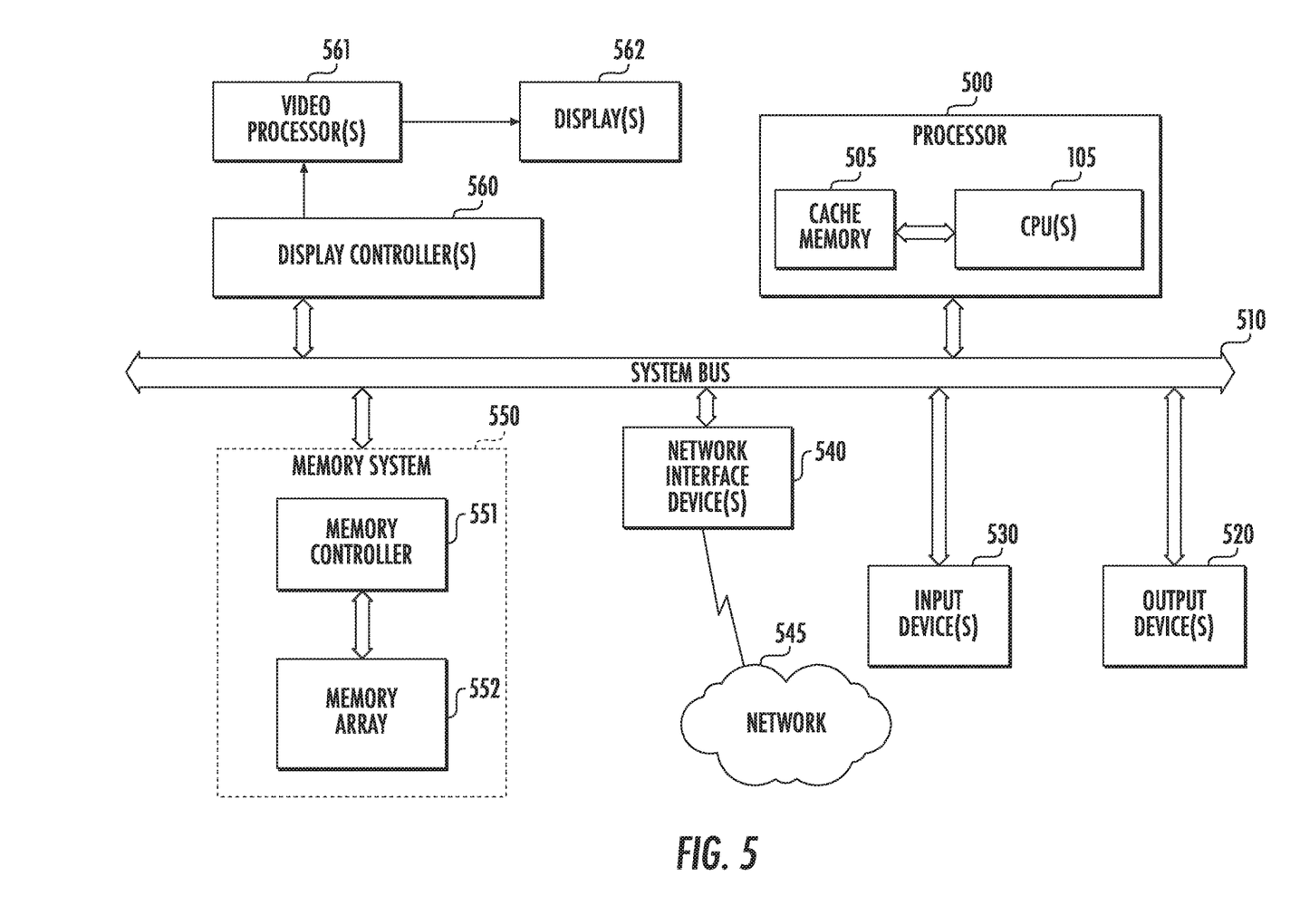
FIG. 5 is a block diagram of an exemplary processor-based system configured to perform a hardware micro-fused memory operation.

In this regard, FIG. 5 illustrates an example of a processor-based system 500 that can support or perform hardware micro-fused memory operations illustrated and described with respect to FIGS. 1-4. In this example, the processor-based system 500 includes a processor 501 having one or more central processing units (CPUs) 505, each including one or more processor cores, and which may correspond to the processor 105 of FIG. 1. The CPU(s) 505 may be a master device. The CPU(s) 505 may have cache memory 508 coupled to the CPU(s) 505 for rapid access to temporarily stored data. The CPU(s) 505 is coupled to a system bus 510 and can intercouple master and slave devices included in the processor-based system 500. As is well known, the CPU(s) 505 communicates with these other devices by exchanging address, control, and data information over the system bus 510. For example, the CPU(s) 505 can communicate bus transaction requests to a memory controller 551 as an example of a slave device. Although not illustrated in FIG. 5, multiple system buses 510 could be provided, wherein each system bus 510 constitutes a different fabric.

Other master and slave devices can be connected to the system bus 510. As illustrated in FIG. 5, these devices can include a memory system 550, one or more input devices 530, one or more output devices 520, one or more network interface devices 540, and one or more display controllers 560, as examples. The input device(s) 530 can include any type of input device, including, but not limited to, input keys, switches, voice processors, etc. The output device(s) 520 can include any type of output device, including, but not limited to, audio, video, other visual indicators, etc. The network interface device(s) 540 can be any devices configured to allow exchange of data to and from a network 545. The network 545 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 540 can be configured to support any type of communications protocol desired. The memory system 550 can include the memory controller 551 coupled to one or more memory units 552.

The CPU(s) 505 may also be configured to access the display controller(s) 560 over the system bus 510 to control information sent to one or more displays 562. The display controller(s) 560 sends information to the display(s) 562 to be displayed via one or more video processors 561, which process the information to be displayed into a format suitable for the display(s) 562. The display(s) 562 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. An apparatus, comprising:
   a rename block comprising a plurality of renaming slots, the rename block configured to:
      receive a first load operation that specifies a plurality of data destination register operands; and
      perform renaming on the first load operation, comprising, for each of the data destination register operands:
         assign a portion of the first load operation as a single operand operation to one of the renaming slots; and
         perform renaming on the single operand;
   a scheduling block configured to receive the renamed first load operation as two individual memory operations, each from one of the renaming slots of the rename block, store the renamed first load operation in a single entry of a plurality of scheduling block entries, and schedule the first load operation as a single operation with a plurality of data register operands; and
   a memory operation block configured to receive the scheduled first memory operation and atomically perform the first load operation across the plurality of data destination register operands,
   wherein the rename block is configured to perform renaming on the first memory load operation by treating each data destination register operand of the plurality of data register operands as an individual memory operation.

2. The apparatus of claim 1, wherein the scheduling block entry storing the renamed first load operation further stores the plurality of data destination register operands.

3. The apparatus of claim 1, wherein the memory operation block is configured to track the plurality of data destination register operands independently.

4. The apparatus of claim 3, wherein the memory operation block supports the full data width of the plurality of data destination register operands in a single pipeline.

5. The apparatus of claim 1, wherein the first load operation is a load pair operation.

6. The apparatus of claim 1, integrated into an integrated circuit (IC).

7. The apparatus of claim 6, further integrated into a device selected from the group consisting of: a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

8. An apparatus, comprising:
   means for renaming to receive a first load operation that specifies a plurality of data destination register operands and perform renaming on the first load operation, comprising, for each of the plurality of data destination register operands:
      assigning a portion of the first load operation as a single operand operation to one of a plurality of renaming slots; and
      performing renaming on the single operand;
   means for scheduling to receive the renamed first load operation as two individual memory operations, each from one of the plurality of renaming slots of the means for renaming, store the renamed first load operation in a single entry of a plurality of entries in the means for scheduling, and schedule the first memory operation as a single operation with a plurality of data register operands; and
   means for performing memory operations to receive the scheduled first memory operation and atomically perform the first memory operation across the plurality of data register operands,
   wherein the means for renaming being configured to perform renaming on the first memory load operation by treating each data register operand of the plurality of data register operands as an individual memory operation.

9. A method, comprising:
   receiving a first load operation that specifies a plurality of data register operands at a rename block;
   performing renaming on the first memory operation by the rename block, comprising treating each data register operand of the plurality of data register operands as an individual load operation, comprising for each of the plurality of data destination register operands:
      assigning a portion of the first load operation as a single operand operation to one of a plurality of renaming slots; and
      performing renaming on the single operand;
   providing the renamed first load operation as two individual memory operations, each from one of the renaming slots to a single entry of a scheduling block;
   scheduling the renamed first load operation as a single operation with a plurality of data register operands; and
   providing the scheduled first load operation to a memory operation block to be performed atomically across the plurality of data register operands,
   wherein the memory operation block is configured to track the plurality of data register operands independently.

10. The method of claim 9, further comprising performing the scheduled first load operation atomically by the memory operation block.

11. The method of claim 10, wherein the scheduled first load operation is performed by a single pipeline of the memory operation block at the full data width of the plurality of data register operands.

12. The method of claim 9, wherein the first load operation is a load pair operation.

13. A non-transitory computer-readable medium having stored thereon computer executable instructions which, when executed by a processor, cause the processor to:

receive a first load operation that specifies a plurality of data register operands at a rename block comprising a plurality of rename slots;
perform renaming on the first load operation by the rename block, comprising, for each of the data register operands:
  assign a portion of the first load operation as a single operand operation to one of the plurality of renaming slots; and
  perform renaming on the single operand;
provide the renamed first load operation as two individual memory operation, each from one of the renaming slots of the rename block, to a single entry of a scheduling block;
schedule the renamed first load operation as a single operation with a plurality of data register operands;
provide the scheduled first load operation to a memory operation block; and
perform the scheduled first load operation atomically by the memory operation block,
wherein performing renaming on the first load operation comprises treating each data register operand of the plurality of data register operands as an individual memory operation.

* * * * *